United States Patent [19]

Studtmann

[11] 4,006,399
[45] Feb. 1, 1977

[54] INDUCTION GENERATOR EXCITATION SYSTEM

[75] Inventor: George Henry Studtmann, Mount Prospect, Ill.

[73] Assignee: Borg-Warner Corporation, Chicago, Ill.

[22] Filed: Sept. 15, 1975

[21] Appl. No.: 613,148

[52] U.S. Cl. .................................. 322/47; 322/28; 322/94

[51] Int. Cl.² .......................................... H02P 9/00

[58] Field of Search ................. 322/28, 47, 87, 91, 322/94; 321/45 C, 7 D

[56] References Cited
UNITED STATES PATENTS

| | | | |
|---|---|---|---|
| 2,611,122 | 9/1952 | Valentin | 322/91 X |
| 3,829,758 | 8/1974 | Studtmann | 322/28 |

Primary Examiner—Robert J. Hickey
Attorney, Agent, or Firm—James J. Jennings, Jr.

[57] ABSTRACT

A background discussion of induction machine equivalent circuits, including operation as an induction generator, is provided. Selective shorting of the machine terminals is described, to convert at least some of the mechanical input energy into electrical field energy for the machine. Systems are described for accomplishing the selective shorting with a single-phase machine, including sensing of the zero-crossing of the output voltage to insure that the shorting is effected at the appropriate time to replenish the field. The shorting time duration can be varied as a function of load. A three-phase shorting circuit is also described.

13 Claims, 22 Drawing Figures

FIG. 5 Equivalent Circuit For Machine With Two Windings

FIG. 6 Simplified Equivalent Circuit

INDUCTION GENERATOR EXCITATION SYSTEM

RELATED APPLICATION

The application of David J. Gritter entitled "Excitation System for Multi-Phase Induction Generator," which is assigned to the assignee of this application, was also filed Sept. 15, 1975, and received Ser. No. 613,147. That application also describes conversion of some of the mechanical energy used to drive an induction generator into electrical field energy by shorting the machine terminals, and claims a three-phase system for effecting sequential closure of the shorting switches.

BACKGROUND OF THE INVENTION

Considerable effort has been directed to the improvement of induction machine circuits, particularly since the development of the solid state switches capable of handling large power levels. Solid state inverters have been developed for use in connection with such machines to provide an alternating output voltage from a d-c input voltage. In studying such arrangements, it was found that after the machine was initially energized, the energization could be removed and the machine's operation maintained as energy is recirculated from the machine through the inverter switches and back to another phase winding of the machine. This discovery was described and claimed in U.S. Pat. No. 3,829,758.

In subsequent work the basic circuitry of the machine-inverter combination has been carefully analyzed, and it now appears that one means of sustaining the field energy of the generator is by periodically short circuiting the terminals of the inverter. This analysis represents a significant contribution of the present invention because, based on this analysis, it is possible to derive and implement a substantially simplified switching arrangement for regulation of the induction machine.

It is therefore a principal object of this invention to provide a system for sustaining the electrical field of an induction generator by periodically shorting the generator terminals.

A closely related object of the invention is to provides a switch arrangement for shorting the generator terminals, with an accompanying control circuit, which is considerably simplified and less expensive than prior art systems.

SUMMARY OF THE INVENTION

A system for sustaining the electrical field of an induction machine constructed in accordance with this invention is useful with such a machine receiving input mechanical energy to operate as a generator, providing an a-c output voltage at its output terminals. In accordance with the present invention a switch means is provided with output connections coupled to the induction machine output terminals, for effectively shorting the machine terminals when a control signal is received. In addition a control circuit is coupled to the switch means for providing such a control signal, to short the induction machine terminals and transform at least some of the mechanical input energy into electrical field energy.

THE DRAWINGS

In the several figures of the drawings, like reference numerals identify like components, and in those drawings;

FIG. 2 is an illustrative diagram.

FIGS. 5 and 6 are simplified equivalent electrical circuits.

FIG. 9 is a graphical illustration.

General Background Discussion

Figure 1:
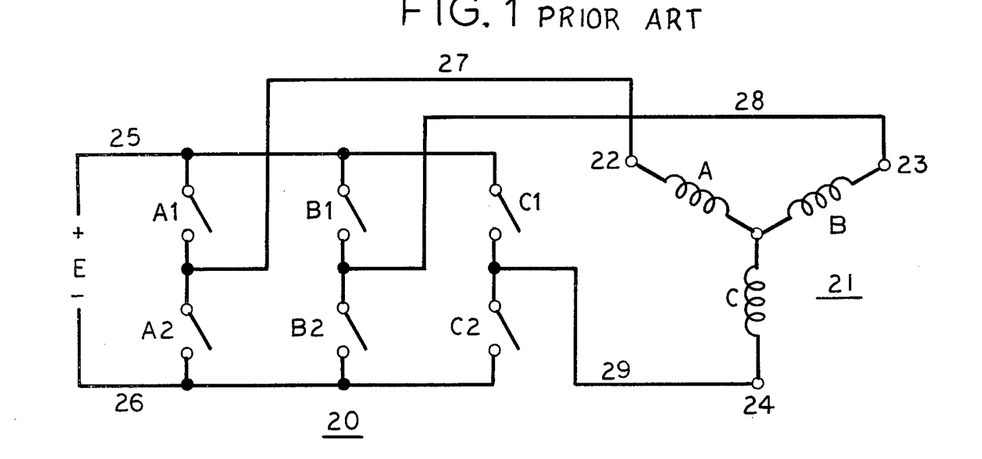
FIG. 1 is a simplified showing of a known inverter-induction machine circuit.
Figure 2:
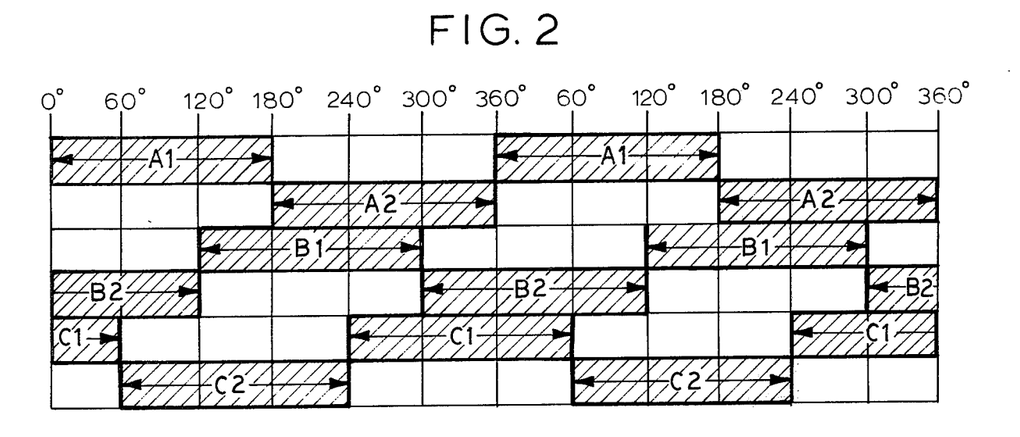

U.S. Pat. No. 3,829,758 describes the use of an inverter circuit as a switching system to recirculate the reactive energy for an induction machine operating as a generator. FIG. 1 is a general showing of such a system in which a three-phase inverter 20 supplies energy to a three-phase generator 21 having individual phase windings designated A, B, and C and terminals 22, 23 and 24. The inverter is a generalized showing and includes six switches A1-C2. A d-c input voltage of a magnitude E is provided over conductors 25, 26, and the inverter provides a three-phase output voltage over conductors 27, 28 and 29 in a well known manner. FIG. 2 shows the times during which each of the inverter switches is closed over 2 cycles of operation. As there shown, switch A1 is closed for the first 180° every cycle, and switch A2 is closed for the succeeding 180° in each cycle. Switch B1 is initially closed at 120° in the cycle, and remains closed until the 300° point in the cycle. Thus in the first cycle or time period, between the times represented by the 120° and 180° legends, switches A1 and B1 are both closed, as is switch C2.

Figure 3:
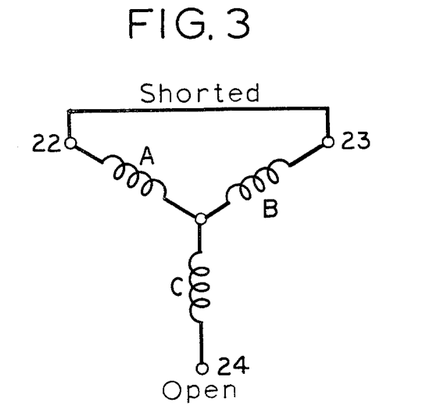
FIG. 3 is a simplified motor illustration, useful in understanding the operation of the circuit shown in FIG. 1.
Figure 4:
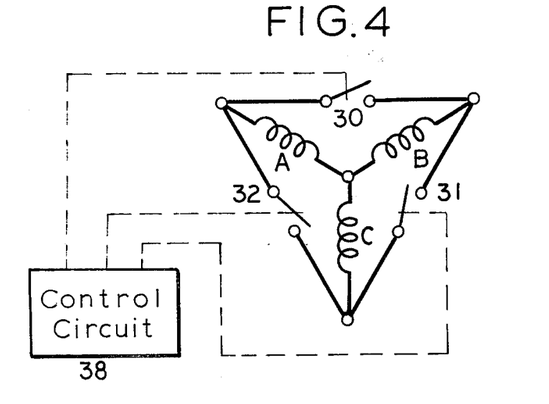
FIG. 4 is a simplified induction machine winding diagrams useful in understanding the principles of the present invention.

When the machine 21 is operating with no electrical load, and both switches A1 and B1 are closed, the equivalent circuit for the machine windings is that represented in FIG. 3. The windings A and B are connected by a short between the terminals 22 and 23 and, under this no-load condition, terminal 24 is open. The diagram of FIG. 2 shows that this short "moves" every 60° to bridge another pair of the machine windings. This suggests that the six switches of the inverter 20 shown in FIG. 1 can be replaced by only three switches, depicted in FIG. 4, which are closed sequentially every 60° as a function of signals received from a control circuit 38. This has substantial practical ramifications in reducing the number of components for the machine energization arrangement. An even more fundamental consideration is the question as to what the real energy conversion process is.

In some earlier work, such as taught in U.S. Pat. No. 3,829,758, it was thought that the inverter circuit which is that shown generally in FIG. 1 in effect recirculates the reactive energy of the machine and thus can provide the requisite excitation. The energy recirculation described in the cited patent is one means for sustaining the field of the induction generator. It now appears that another phenomenon exists, and the field is sustained because the inverter acts as a periodic short. Such a short would tend to brake the machine, causing an energy conversion or transfer from mechanical energy to electrical energy. Some of this energy is dissipated, and some apparently goes into the electrical field. The better to consider such energy conversion, it is expedient at this point to develop and explain and equivalent circuit for the machine, to provide insight into the energy conversion process.

Figure 5:
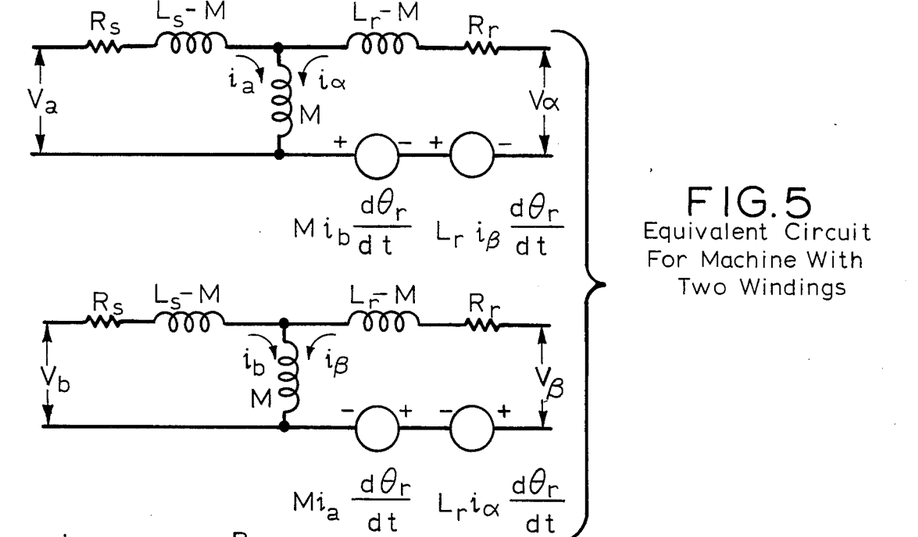

The equivalent circuit of a two-phase machine as depicted in FIG. 5 shows the various values referred to the stator. Each of the two circuits represents the equivalent circuit looking into one winding of a two-phase machine, with the windings disposed at 90° relative to each other. The upper circuit represents a first winding A, wound on a given or main axis, and the lower circuit represents the second winding B, wound on a cross axis which is perpendicular to the main winding A. If additional background material regarding such equivalent circuits is desired, it can be found in the article of H. C. Stanley entitled "An Analysis of the Induction Machine," printed in the AIEE Transactions, Volume 57 (1938), at pages 751–757, or the text by C. V. Jones entitled "The Unified Theory of Electrical Machines". The mutual inductance M between the stator and rotor is shown in the center of each phase winding diagram; the stator values are identified with the subscript $s$, and the rotor values are indicated by the subscript $r$. For example $R_s$ indicates the resistance of the stator, and the inductance denoted $L_s - M$ represents the inductance of the stator minus the mutual reactance. The first voltage generator provides a voltage equal to the mutual reactance times the current $i_b$, times $d\theta r/dt$, the instantaneous angular velocity of the rotor. Of course if there is no acceleration or deceleration the term $d\theta r/dt$ becomes a constant. The same is true for the other terms, if the angular velocity of the machine is constant. While this equivalent circuit arrangement is satisfactory for many analyses, it is helpful to make certain assumptions to simplify this circuit and provide and arrangement which facilitates basic consideration of the interaction between the phase circuits. To that end a simplified equivalent circuit for a two-phase machine has been developed and shown in FIG. 6.

Figure 6:
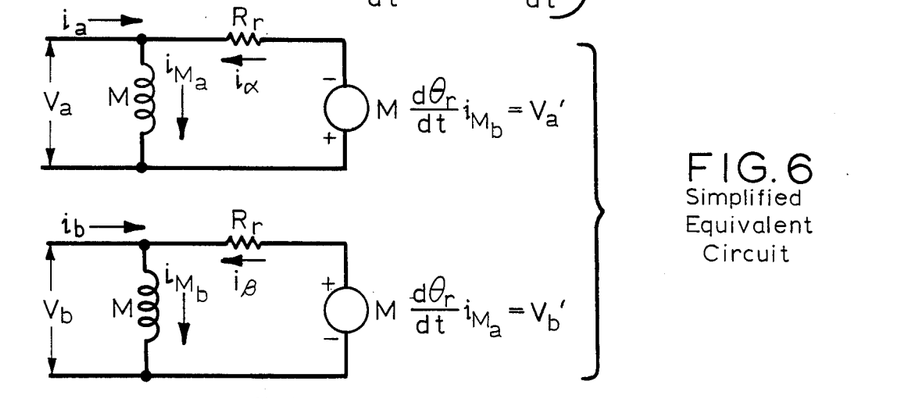

There are certain assumptions made to achieve this circuit. In the first instance, the rotor resistance $R_s$ is assumed to be zero. In addition the leakage reactance is assumed to be zero; thus $L_r = M$, and $L_s = M$. Also in the top of FIG. 5 it is apparent that the magnetizing current for the main axis is represented by $i_a + i_\alpha$ and the magnetizing current for the cross axis flux is $i_b + i_\beta$. This is simplified and shown in the equivalent circuit of FIG. 6 as magnetizing current $i_{M_a}$ for the magnetizing current of the main branch, and $i_{M_b}$ as the magnetizing current for the cross axis. With these assumptions the circuit can be represented as shown in FIG. 6. The two voltage generators represent the back emf of the machine. Each back emf is proportional to the instantaneous rotor velocity, and also to the magnetizing current of the opposite phase. That is, the back emf in the main axis is proportional to the magnetizing current of the cross axis circuit, and the back emf in the cross axis is proportional to the magnetizing current $i_{M_a}$ for the main axis. The power delivered by the back emf generators represents the electrical output of, and hence the mechanical power input to, the machine. The torque T for this simplified arrangement is expressed by $$T = M(i_b i_\alpha - i_a i_\beta)$$

This expression reduces to the usual expression for the torque given by the conventional circuit if the appropriate expressions for the currents are substituted. It is evident from this expression that, for the machine to develop a torque, there must be a stator current flow. If there are rotor currents flowing but the machine is unloaded, it does not produce any torque. It is also noted from this expression that the torque can be considered as produced by the rotor current of one axis interacting with the magnetizing current of the other axis. To appreciate these various aspects of the simplified equivalent circuit and the torque expression, it will be helpful to consider the simplified physical illustration set out in FIG. 7.

Figure 7:
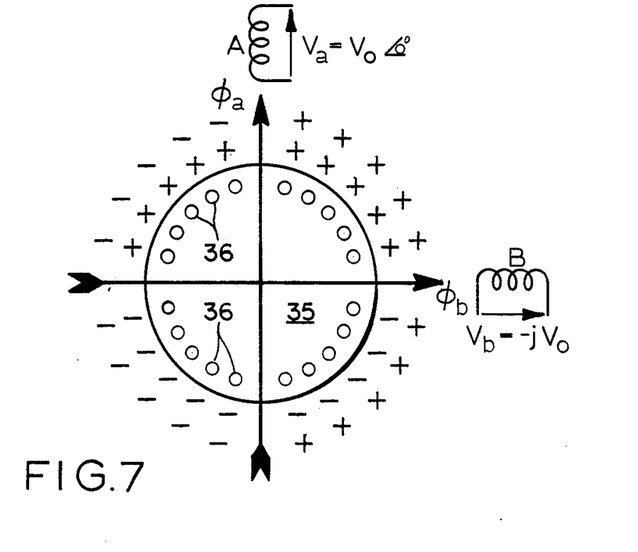
FIG. 7 is a simplified physical illustration, of a two-phase induction machine, useful in understanding the present invention.

In this figure the rotor 35 of the induction machine is shown generally in section, with a plurality of conductors 36 represented near the periphery of the rotor which is moving at an angular velocity $\omega_r$. It is easiest to consider a simplified two-phase system with balanced sine-wave operation. A first voltage $V_a$ is considered as applied to winding A, and a second voltage $V_b$ is applied to the B winding. This second voltage lags behind the first in time or phase by 90°. As represented in FIG. 7, the magnetizing currents are those identified $i_{M_a}$ and $i_{M_b}$ in FIG. 6.

Considering first voltage $V_a$, this produces a flux $\phi_a$. The conductors 36 rotate through this first flux field at an angular velocity corresponding to the rotor speed $\omega_r$. The rotor winding is in effect a commutated winding. Thus although the rotor bars are moving physically, the emf pattern may be envisioned as fixed in space. Thus these moving conductors have an emf induced in them, the polarities of which are indicated by the inner circle of polarity signs adjacent the rotor in FIG. 7. The emf thus induced is in a direction to cause a current to want to circulate in a path perpendicular to the cross axis; the cross axis is parallel with the flux vector $\phi_b$. This emf is in fact the back emf represented as $V_b'$ in the equivalent circuit of FIG. 6. This emf opposes the voltage induced by the flux $\phi_b$ produced by the stator voltage $V_b$. Similarly the emf induced in the conductors 36 by the flux $\phi_b$ has a polarity indicated by the outer circle of polarity signs in FIG. 7. This emf attempts to cause a current to circulate in a path perpendicular to the main axis. This emf is the back emf $V_a'$ shown in the upper part of the equivalent circuit in FIG. 6, and it opposes the voltage induced by the flux $\phi_a$. The respective rotor currents will then flow as determined by the difference of the stator voltage (referred to the rotor) and the back emf, divided by the rotor resistance (or, more generally, the rotor input impedance).

The important consideration is that two flux systems, at right angles to each other, are involved in motor (or generator) operation. The two fluxes give rise to the "speed" emf's which are the back emf's of the machine ($V_a'$, $V_b'$). The magnitudes of the fluxes are proportional to the exciting currents $i_{M_a}$ and $i_{M_b}$. The axes are cross coupled by virtue of the fact that the magnitude of $i_{M_a}$ controls $V_b'$, and the magnitude of $i_{M_b}$ controls $V_a'$. Thus $i_{M_a}$ may be viewed as a kind of field current for control of generator $V_b'$, and current $i_{M_b}$ can be seen as a field current to control generator $V_a'$.

Figure 8:
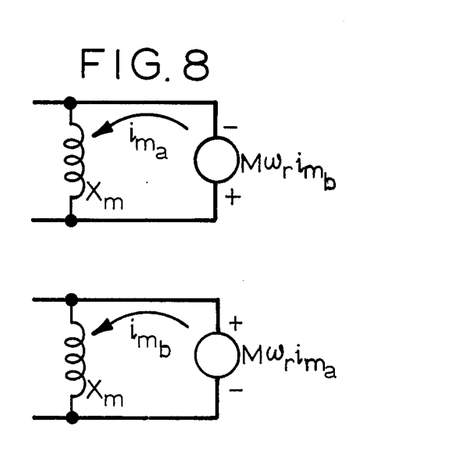
FIG. 8 represents a further simplification of the equivalent circuit depicted in FIG. 6.

The preceding analysis can now be applied to a consideration of sustaining the field of an induction generator by periodic shorting. To accomplish this, a machine will first be considered in which a flux has already been established, and the equations will be developed for the voltages and currents involved. It will then be shown that a periodic short of the terminals may be used to sustain the field. To this end the cross coupled circuits depicted in FIG. 6 can be simplified still further by neglecting the rotor resistance, to provide the equivalent circuit of FIG. 8. The characteristic equations describing these circuits may easily be shown to be $$\frac{d^2 i_{M_a}}{dt^2} + (\omega_r)^2 i_{M_a} = 0$$

and $$\frac{d^2 i_{M_b}}{dt^2} + (\omega_r)^2 i_{M_b} = 0$$

These equations are known to have the solutions $$i_{M_a} = I_o \sin \omega_r t \qquad \begin{cases} \text{assuming } i_{M_2} = 0 \\ \text{at } t = 0 \end{cases}$$
$$i_{M_b} = I_o \cos \omega_r t$$

The terminal voltage will be found by $$V_a = i_{M_a} \cdot j\omega M_a$$

$$V_b = i_{M_b} \cdot j\omega M_b$$

These solutions show that if the rotor is rotating at an angular velocity $\omega_r$, and a current is initially induced in the rotor, sinusoidal terminal voltages at a frequency $\omega_r$ will be produced. Had the rotor and stator resistances been maintained and considered in the equations, a damped sinewave voltage solution would have been produced.

The solutions of the equations shown above may be verified by exciting the machine from a conventional power line, or by remanent magnetization of the machine. The specific method of initial energization during system start-up is not important to the invention. After initial energization the excitation is removed and the terminal voltage observed. Damped sinewave voltages displaced in phase by 90° from each other (for a two-phase machine) and alternating at a frequency $\omega_r$ have been observed. Accordingly, once excited the machine has flux trapped in the rotor. This flux is decaying in time, due to the losses. To achieve generator operation some means must be used to replenish the rotor flux, at least periodically.

One method of periodic flux replenishment includes the periodic shorting of the machine terminals, as will be explained in conjunction with FIG. 9. As there shown the currents $i_{M_a}$ and $i_{M_b}$ are represented by the curves 40, 41 and the voltages $V_a'$ and $V_b'$ are depicted by the curves 42, 43. The first 90° of each curve occurs in the interval $t1$, and the subsequent intervals $t2$, $t3$ and $t4$ represent the remainder of one cycle of operation. If, as shown in FIG. 10, a short is applied to the terminals of the A phase winding at a time when the current $i_{M_a}$ is equal to a peak (referenced as some value $I_o$), such as at the beginning of the interval $t2$ of the beginning of the interval $t4$ in FIG. 9, then the current locked in the inductance $M_a$ will be clamped (ideally at the value $I_o$) as shown by the dashed line 44 at the beginning of interval $t2$ in curve 40. The voltage $V_b'$ will also be clamped as represented by broken line 45, since this voltage is proportional to $i_{M_a}$. The current $i_{M_b}$ will become a linear ramp (broken line 45) as shown at the beginning of the interval $t2$ in curve 41, instead of following the natural damped sinewave curve. The voltage $V_a'$ will also be a ramp, as represented by dashed line 46, as this voltage is proportional to the current $i_{M_b}$.

During the intervals $t2$ and $t4$, energy is flowing into the cross axis conveniently represented by $M_b$. This energy at any given time is represented by ½ M $(i_{M_b})^2$. Since the linear ramp results in a greater current than would occur with the damped sinewave, then a greater amount of energy is caused to flow into $M_b$ than would be the case in the normal decay, wherein the field energies are exchanged each quarter cycle of operation. This additional energy comes from the mechanical input to the machine.

If the mechanical power P is calculated during this time interval it is found that $$P = -M \left[ \frac{(\omega_r)^3 (I_o t)^2 M}{R_2} + (I_o \omega_r)^2 t \right]$$

The negative sign implies a braking torque accompanies the electrical generation of power. The power absorbed by the resistor will be found to be $$P_r = \frac{M^2 (\omega_r)^4 (I_o t)^2}{R_2}$$

and the power $P_{M_b}$ into $M_b$ is found to be $$P_{M_b} = M(\omega_r I_o)^2 T$$

Comparing these last two equations with the expression for mechanical power shows that the mechanical power is totally accounted for, part being dissipated and part being stored in the field. Thus by periodic shorting of the stator terminals, energy can be transformed from mechanical input energy to electrical field energy. This can allow the machine to sustain its field without any external means for energy storage.

It will be noted that when the short is applied, the current and voltage are, in a sense, "clamped" until the short is removed. The result of this action on a periodic basis is to slow down the frequency of the electrical circuit with respect to the mechanical drive frequency, and this results in the usual negative slip phenomenon.

Figure 11:
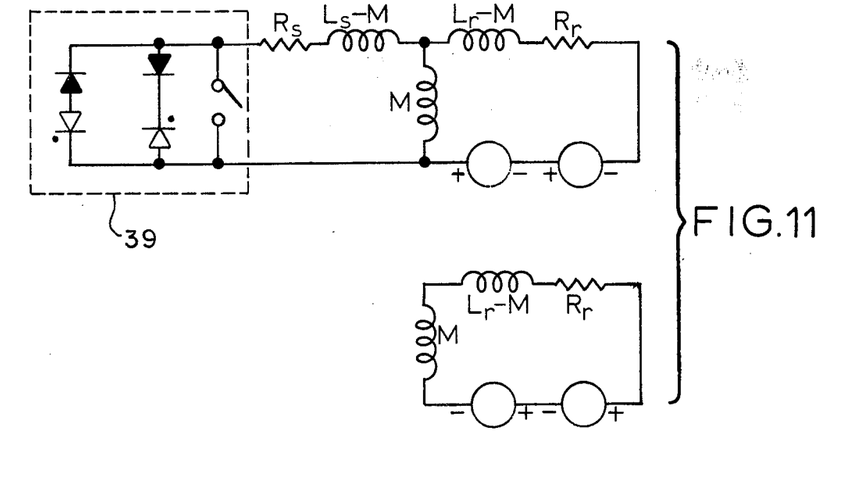
FIG. 11 is a representation of a circuit used with an analog computer to demonstrate certain aspects of the feasibility of the invention.

The complete equivalent circuit for a single-phase machine has been put on the analog computer, and the results (conversion of mechanical input power to sustain the electrical field) verified. FIG. 11 shows the circuit used on the analog computer, based on the showing of FIG. 5. Circuit 39 was added to provide a switch for shorting the terminals of the A phase, and a clipping circuit with Zener diodes for absorbing the energy. The input side of the B winding circuit is omitted because this winding was left open when the A phase winding was shorted. The effect of leakage reactance is such that the short cannot be nearly as effective because the leakage reactance tends to prevent energy from flowing into the quadrature field. In a single-phase machine operation at a per unit reactance greater than about four percent will result in failure to maintain operation. A machine of such low leakage reactance was not available at the time of preparing this application, so the results for a single-phase machine were not empirically verified. However the demonstrations with the plural-phase machines and the evidence obtained in conjunction with the analog computer indicates that the single-phase machine operation will be successful when a machine of sufficiently low leakage reactance is obtained. Hence the term "induction machine," as used in the appended claims, embraces both single-phase and plural-phase machines.

Figure 12:
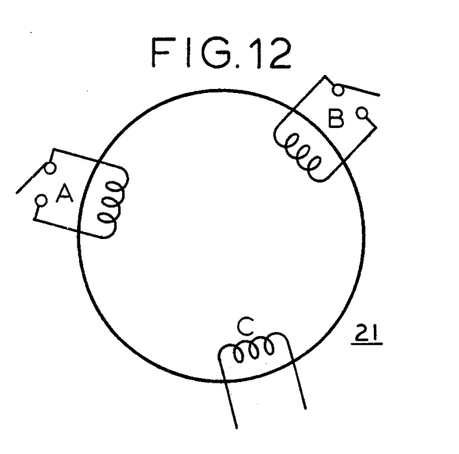
FIG. 12 is a simplified machine diagram useful in understanding operation of a three-phase machine with only two windings used as isolated windings.

Successful operation with three-phase machines has been readily obtained as previously mentioned. The reason for this proven success with a three-phase machine may be that there are three times as many "shorts" or field replenishments in each cycle. Thus even though the leakage reactance diminishes their effectiveness, the cumulative build-up is sufficient to sustain the field. Additionally, operation with two insolated windings of a three-phase machine has also been successfully demonstrated. For example, the A and B windings of the machine 21 shown in FIG. 12 can be used as the two isolated windings.

Figure 9:
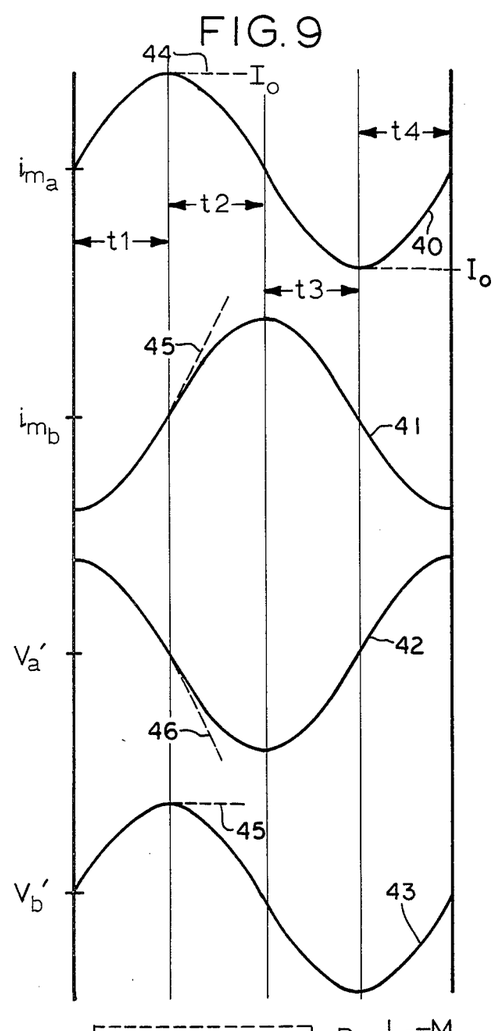
Figure 10:
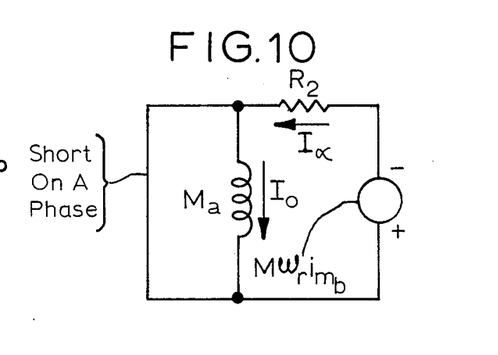
FIG. 10 is a simplified equivalent circuit diagram, useful in conjunction with FIGS. 5-8 in understanding the principles of the present invention.

It may be seen by examination of FIG. 9 that shorting the phase A terminals during the periods $t2$ and $t4$ will result in energy flowing into the cross field B. That is, both $V_b'$ and $i_{M_b}$ have the same sign during these intervals, and hence the instantaneous power is positive or into the field. Shorting the A phase terminals during intervals $t1$ and $t3$ will result in greater decay, since $V_b'$ and $i_{M_b}$ have opposite polarities and thus energy is coming out of the field at that time. Thus the timing of the terminal shorting is critical.

It will be understood that the system must be started and brought up to speed before the terminals are shorted to sustain the field. Remanent magnetization can be used; for example, small magnets can be attached to the rotor for start-up. Alternatively, the machine terminals can be connected to an a-c line during start-up and then the line can be disconnected prior to shorting the machine terminals. Those skilled in the art will doubtless devise other arrangements for starting the system.

The intermittent terminal shorting to provide for periodic replenishment of the field as just described can be implemented in different ways. One circuit includes a synchronous approach, using a system such as that shown in FIG. 13. As there shown, an induction machine 50 receives mechanical power input over shaft 51 to provide an alternating output voltage on the conductors 52, 53. This voltage is in turn passed over the conductor pairs 54, 55 and 56, 57 to energize any suitable load (not shown).

Figure 13:
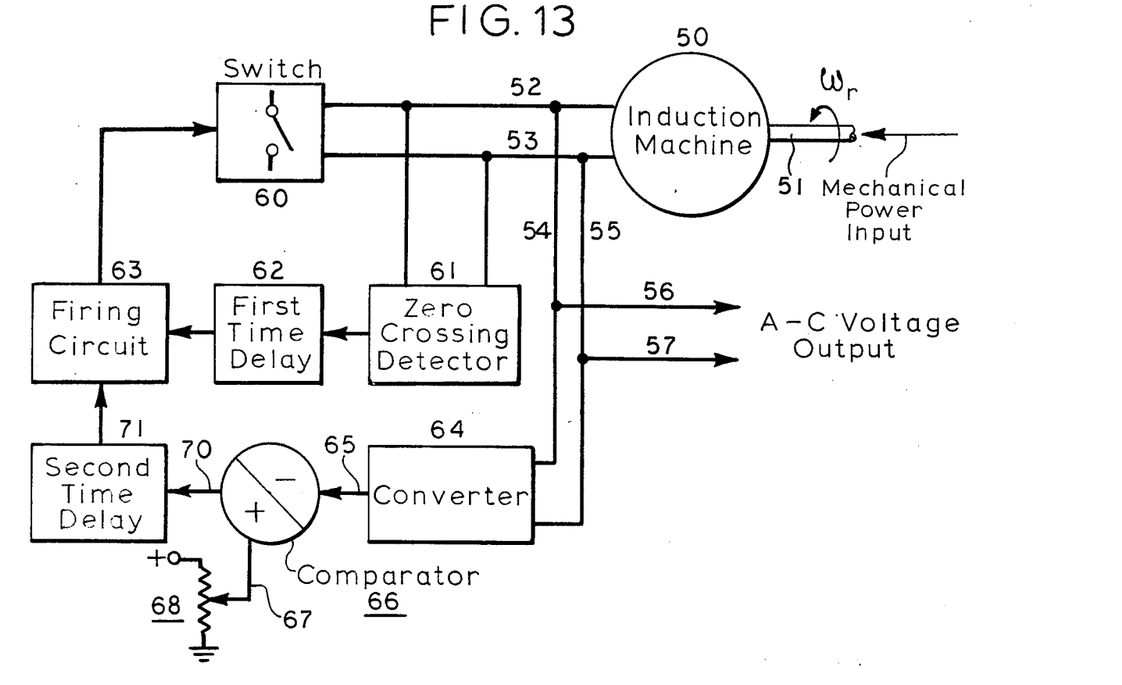
FIGS. 13 and 14 are simplified block diagrams of switching arrangements constructed in accordance with the present invention, as used in conjunction with a single-phase induction machine.

In accordance with the present invention, a switch 60 is also provided and coupled to the conductors 52, 53 to provide for intermittent shorting at predetermined times. A zero crossing detector 61 is coupled to the conductors 52, 53 to sense the zero crossings in each cycle of the output voltage on conductors 52, 53. Each time such a crossing is detected a control signal is passed to the first time delay circuit 62, for passing an actuating signal to the firing circuit 63, to regulate the time at which switch 60 is initially closed. It is preferable to provide a delay circuit 62 which is adjustable to vary the time delay from the zero crossing to the closure of switch 60, as the optimum time to initiate shorting may vary from machine to machine.

In addition a converter circuit 64 also receives the output voltage from conductors 54, 55 to produce a single output signal on line 65 indicative of the amplitude of the induction machine output voltage. The signal on line 65 is applied to one input connection of a comparator circuit 66, which receives another input signal over line 67 from the adjustable arm of a potentiometer or other reference signal source 68. The signals on lines 65 and 67 are summed algebraically to provide an output signal from comparator 66, which is then applied over line 70 to a second time delay circuit 71. This circuit provides an output signal the duration of which is a function of the difference between the reference signal on line 67 and the actual voltage signal on line 65. The resultant signal from second time delay circuit 71 determines the time duration during which switch 60 remains closed, after being closed as a function of the signal from first time delay circuit 62. Hence the operation of firing circuit 63 is modified to produce the operation of switch circuit 60 at the appropriate time, and for the proper time duration, to compensate for variations in the motor speed, electrical load and other variables. The greater the load, the longer the shorting time duration must be and hence the slower must be the electrical frequency. In addition as the electrical frequency is reduced, the negative slip of the system becomes larger. Those skilled in the art will readily implement the selective shorting arrangement from the known components and sub-systems depicted in FIG. 13.

Figure 14:
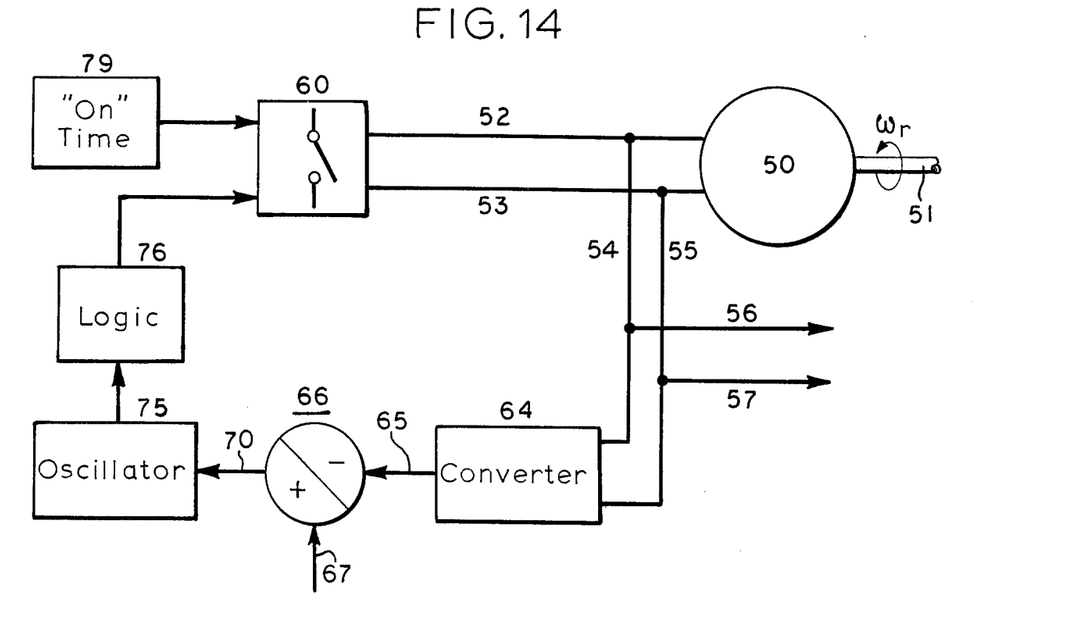

Another system for implementing the teachings of this invention is depicted in FIG. 14. This system generally adjusts the frequency of the shorting (with, for example, a fixed shorting time duration provided by "on" time stage 79) as a function of the load voltage. As the load is increased, the frequency of the output voltage is decreased, and hence the negative slip is made larger. This is accomplished by the change in the voltage from converter 64 applied over line 65 to the comparator 66 as the load is increased. Given the same input reference voltage on line 67, the voltage at the output connection 70 of the comparator is applied to an oscillator 75, which can be of the voltage-controlled type. This oscillator in turn produces pulses to regulate the frequency of operation of logic circuit 76 to control the actuation of the shorting switch 60.

Figure 15A:
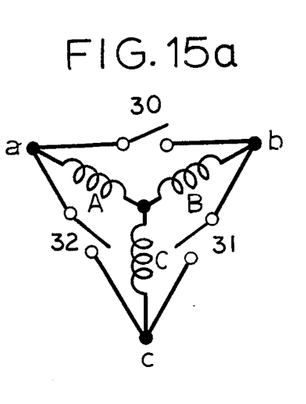
FIGS. 15A, 15B and 15C are simplified illustrations useful in understanding application of the present invention to three-phase circuits.

The description of FIGS. 13 and 14 indicates the general implementation of this invention in connection with a single-phase induction machine. To operate a three-phase system, a three-switch configuration such as shown in FIG. 15A can be provided. Each of the static swiches 30-32 can be of the type in which a thyristor is connected in a diode rectifier bridge circuit to effect true two-way switching. One such power switch is described and claimed in the application of George H. Studtmann, Ser. No. 590,883, filed June 27, 1975, for a "Bipolar Inverter with Induction Generator." In the application of David J. Gritter, Ser. No. 591,364, filed June 30, 1975 for a "Complementary Commutation Circuit for Bipolar Inverter," a power switch circuit with complementary commutation is described and claimed. Either arrangement can be used to implement the system as shown in FIG. 15A. To simplify the construction and operation of the circuit, a more detailed showing will be set out hereinafter in FIG. 16.

Figure 15B:
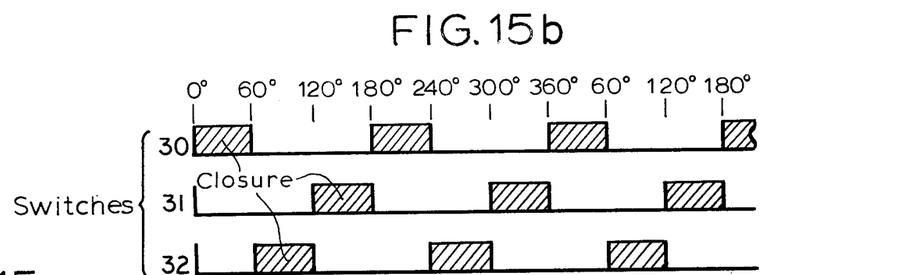
Figure 15C:
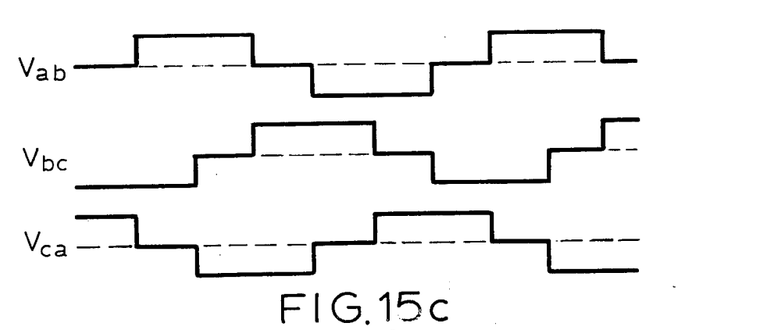

FIGS. 15B and 15C represent the switch closure times for the switches 30, 31 and 32 over 1½ cycles of operation, and also show the resultant voltages produced between the terminals a, b, and c in FIG. 15A. From inspection of these two figures, it is apparent that the switch closures occur in a phase sequence opposite to that of the terminal-to-terminal voltages, and also occur at a frequency twice that of the voltages. Each of the switches is closed for 60 electrical degrees, and only one switch is closed at any given time. This contrasts with the three-phase, six-switch inverter 20 depicted in FIG. 1, as FIG. 2 shows that three of the six switches are closed at any given time in the usual case.

Figure 16:
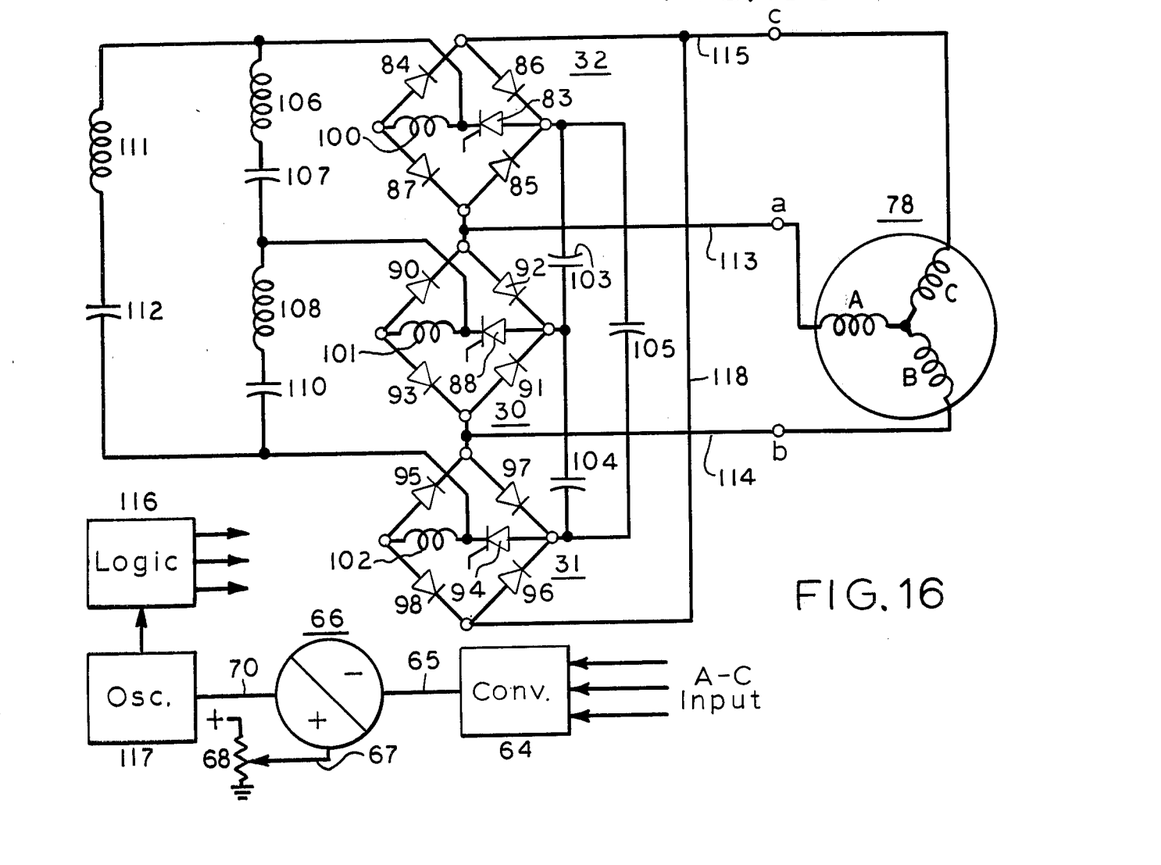
FIG. 16 is a schematic diagram, partly in block form, depicting a three-phase system.

FIG. 16 shows a three-phase system including a three-phase motor 78 coupled to one exciter circuit which has three power switches 30, 31 and 32. Switch 32 includes a thyristor 83, such as an SCR or other suitable switch, and four diodes 84, 85, 86 and 87 connected in the usual rectifier bridge configuration. Likewise the second power switch 30 includes a thyristor 88 and diodes 90, 91, 92 and 93. The third power switch 31 includes thyristor 94 and diodes 95-98. In addition there are components which assist in the commutation operation of the thyristors in the respective power switches. An inductor 100 is coupled in series with thyristor 83 in the uppermost power switch 32, and additional inductors 101 and 102 are similarly connected in the other power switches. Three capacitors 103, 104 and 105 are connected as shown to the terminals of the three different power switches. There are three additional component pairs which cooperate in the commutation. An inductor 106 and capacitor 107 are coupled in series between the mid-points (connections between inductor and thyristor) in each of the power switches 32 and 30. Similarly inductor 108 and capacitor 110 are series-coupled between the mid-points of the two switches 30 and 31, and the circuit including inductor 111 and capacitor 112 is coupled in series between the mid-points of the power switches 31 and 32. In general the power switch provides for true two-way current flow in either direction when the thyristor in the respective switch is gated on. The gating signals are provided by conventional circuits, generally depicted as a logic circuit 116 regulated by an adjustable or voltage-controlled oscillator 117. The other components 64, 66 and 68 are similar to those described in connection with FIGS. 13 and 14.

When thyristor 83 in the switch 32 is gated on, current can flow from the upper input terminal through diode 86, thyristor 83, inductor 100 and diode 87 to the other input terminal. Conversely if the applied polarity is opposite that for the current flow just described, current can then flow from the lower input terminal of switch 32 through diode 85, thyristor 83, inductor 100 and diode 84 back to the upper input terminal. It is apparent that each of the other two power switches 31 and 32 will operate in a similar manner.

From the explanation given in the above-identified application of David J. Gritter, it is noted that a commutation circuit such as that depicted in that application and the one in FIG. 15 of this application works very well when isolated from solid voltage sources by an inductance having a value that is large compared to the value of the circuit commutating inductance. Accordingly the leakage reactance of the induction generator is of advantage in increasing the operating efficiency of the exciter circuit depicted in FIG. 16. The inductors 106, 108 and 111 can be virtually ignored in considering the cummutation operation. The physical size of each is relatively small compared to inductors 100–102, and inductors 106, 108 and 111 serve mainly to limit the rate of current rise for the respective thyristors 83, 88 and 94 when they are gated on.

Figure 17A:
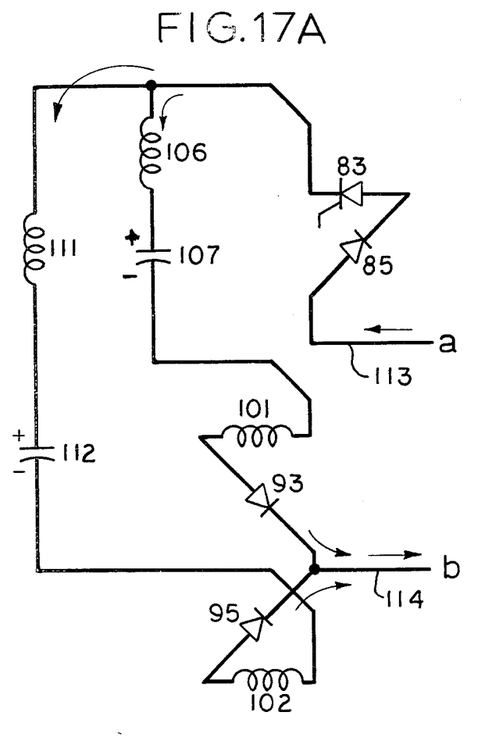
FIGS. 17A–17D are partial schematic diagrams useful in explaining the operation of the circuit shown in FIG. 16.

The operation of the circuit in FIG. 16 will be best understood in connection with the partial circuit showings in FIGS. 17A–17D. It is initially assumed that the exciter begins to operate at a time corresponding to the 60° point in the first cycle of the showing in FIG. 15B. No capacitors are charged and the terminal voltage applied between conductors 113, 114 is positive on conductor 113 with respect to that on conductor 114. Representation of switch closure 32 in FIG. 15B means that a signal is received from logic circuit 116 in FIG. 16 to gate on thyristor 83 in power switch 32 at the 60° point in this cycle of operation. Current then flows from conductor 113 as shown in FIG. 17A, through diode 85 and the gated-on thyristor 83, dividing to pass into the commutating circuits 106, 107 and 111, 112. Current from capacitor 107 flows through inductor 101 and diode 93 to conductor 114. The alternate path is completed through inductor 102 and diode 95 back to conductor 114. Accordingly the capacitors 107 and 112 are charged with the polarities indicated in FIG. 16A.

Figure 17B:
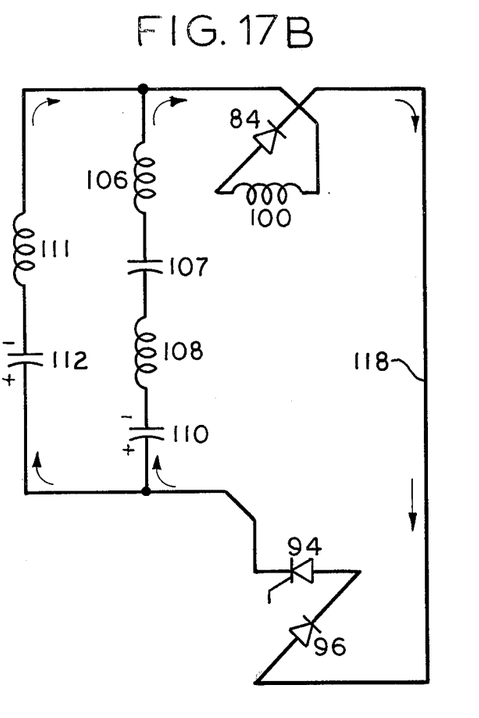

At the time represented by the 120° mark in FIG. 15B, switch 31 closes. This means that a signal from the logic circuit 116 gates on the thyristor 94 in FIG. 16, completing a path for current flow as shown in FIG. 17B. As soon as the commutating current rises to the level of the load current, thyristor 83 is turned off and the conduction path remains as shown in FIG. 17B. The voltage for reverse-biasing thyristor 83 is developed across the inductor 100 in the current path shown. Capacitor 112 is discharged and the polarity of the charge is reversed as the current flows as shown; the charge on capacitor 107 goes to zero, and capacitor 110 is charged with the polarity shown in the drawing. Considering FIG. 16, it might be thought that current, instead of flowing through the common link 118 as shown in FIG. 17B, could flow through capacitor 105. However such current flow would charge capacitor 105 and reverse bias those diodes through which current must flow to complete the circuit through capacitor 105. The charge across each of the capacitors 107, 110 and 112 was reversed at the time when the current in the inductor 100 decreased to the level flowing just prior to the closure of switch 31. Current flow from that time on results in an overcharge on the capacitors.

Figure 17C:
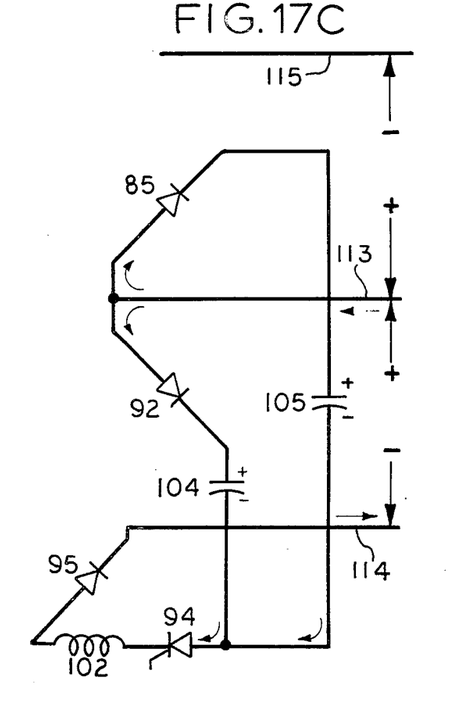
Figure 17D:
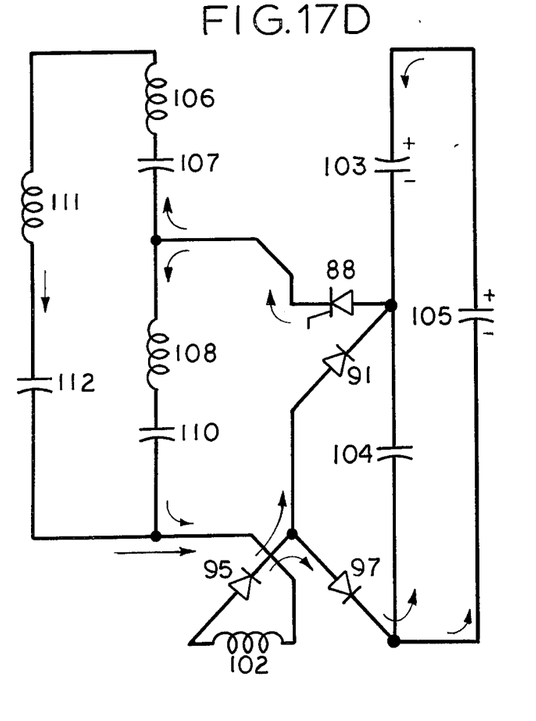

In addition to the main commutating current path depicted in FIG. 17B, there are now circuit paths completed to allow capacitors 104 and 105 to charge, as shown in FIG. 17C. The line voltages have the polarity shown at the right of the figure, and there is no potential difference between conductors 114 and 115 at this time. The capacitors 104, 105 will charge to the line voltage with the polarity shown but will charge no further, because the voltage across inductor 102 is clamped.

The next commutation action occurs at the time represented by the 180° point in the first cycle in FIG. 15B. The drawing shows that switch 30 is closed at this time, and this means that thyristor 88 is gated on by a pulse from logic circuit 116 to complete the path for current flow shown in FIG. 17D. The current flowing through this thyristor splits, part going through the series circuit 108, 110, and the other through the series path including capacitor 107, inductors 106, 111 and capacitor 112. At this point the currents are joined to flow through inductor 102 and diode 95. Initially this current flows through diode 97, where part returns through capacitor 104, effectively discharging this capacitor. The remainder flows through capacitors 105 and 103, providing equal and opposite charges on these capacitors at the end of the commutation operation. When capacitor 104 has been discharged its voltage is clamped, and the remainder of the commutation current flows through diode 91, back to the anode of thyristor 88.

In the appended claims the term "connected" means a d-c connection between two components with virtually zero d-c resistance between those components. The term "coupled" indicates there is a functional relationship between two components, with the possible interposition of other elements between the two components described as coupled or inter-coupled."

While only particular embodiments of the invention have been described and claimed herein, it is apparent that various modifications and alterations of the invention may be made. It is therefore the intention in the appended claims to cover all such modifications and alterations as may fall within the true spirit and scope of the invention.

What is claimed is:

1. A system for sustaining the magnetic field of an induction machine receiving input mechanical energy and operating as a generator, which machine has a pair of output terminals for providing an a-c output voltage, comprising:
   switch means, having output connections coupled to the induction machine output terminals for effectively shorting the machine terminals responsive to receipt of a control signal; and
   a control circuit, coupled to the switch means, for providing the control signal to effect closure of the switch means and shorting of the induction machine terminals to transform some of the mechanical input energy into electrical field energy.

2. A system for sustaining the magnetic field of an induction machine receiving input mechanical energy and operating as a generator, which machine has a pair of output terminals for providing an a-c output voltage, comprising:
   switch means, having output connections coupled to the induction machine output terminals for effectively shorting the machine terminals responsive to receipt of a control signal; and
   a control circuit, coupled to the switch means, for providing the control signal to effect closure of the switch means and shorting of the induction machine terminals to transform some of the mechanical input energy into electrical field energy, and in which said control circuit includes a firing circuit coupled to the switch means for providing said control signal, and a zero crossing detector circuit, coupled between the induction machine output terminals and the firing circuit, to regulate issuance of said control signal as a function of the induction machine output voltage.

3. A system as claimed in claim 2, and further comprising a time delay circuit, coupled between the firing circuit and the zero crossing detector circuit, for delaying issuance of said control signal for a predetermined period after a signal is provided by the zero crossing detector circuit.

4. A system as claimed in claim 2, and further comprising a time delay circuit, coupled to said firing circuit, operable to terminate said control signal at a predetermined time, thus regulating the total closure duration of said switch means.

5. A system as claimed in claim 4, and further comprising additional circuit means coupled to said time delay circuit to regulate its operation, which additional circuit means includes a comparator connected to algebraically sum a reference signal and an input signal which varies as a function of the induction machine output voltage amplitude, which algebraic sum signal is applied to the time delay circuit to regulate the total closure duration of said switch means.

6. A system as claimed in claim 1, and in which said control circuit includes a logic circuit coupled to said switch means to provide said control signal, an oscillator circuit connected to supply pulse signals to the logic circuit, and a comparator circuit connected to regulate operation of the oscillator circuit as a function of the difference between a reference signal and a second signal which varies as the electrical load.

7. A system as claimed in claim 6, and further comprising a timing circuit coupled to said switch means for regulating the total closure time of the switch means after the control signal is provided by the logic circuit.

8. A system for sustaining the magnetic field of an induction machine receiving input mechanical energy and operating as a generator, which machine has a pair of output terminals for providing an a-c output voltage, comprising:
   switch means, having output connections coupled to the induction machine output terminals for effectively shorting the machine terminals responsive to receipt of a control signal to transform at least some of the mechanical input energy into electrical field energy;
   a firing circuit, coupled to the switch means, for providing the control signal to effect closure of the switch means; and
   a zero crossing detector circuit, coupled between the induction machine output terminals and the firing circuit, for regulating the firing circuit to provide the control signal as a function of the zero crossing in the wavesshape of the induction machine output voltage.

9. A system as claimed in claim 8, in which the switch means includes a power switch having a rectifier bridge circuit and a thyristor coupled between a pair of terminals in the rectifier bridge circuit to complete a path for current flow through the power switch when the thyristor is gated on.

10. A system as claimed in claim 8, amd further comprising a first time delay circuit, coupled between the firing circuit and the zero crossing detector circuit, for delaying issuance of said control signal for a predetermined period after a signal is provided by the zero crossing detector circuit.

11. A system as claimed in claim 10, and further comprising a second time delay circuit, coupled to said firing circuit, operable to terminate said control signal at a predetermined time, thus regulating the total closure duration of said switch means.

12. A system as claimed in claim 11, and further comprising a comparator circuit coupled to said second time delay circuit to regulate its operation, which comparator circuit is connected to algebraically sum a reference signal and an input signal which varies as a function of the induction machine output voltage amplitude, which algebraic sum signal is applied to the second time delay circuit and thus regulates the total closure duration of said switch means.

13. A system for sustaining the magnetic field of a multi-phase induction machine receiving input mechanical energy and operating as a generator, which machine has output terminals for providing an a-c output voltage, comprising:

a plurality of switch means, corresponding in number with the number of phase windings in the induction machine, having output connections coupled to the induction machine output terminals for effectively shorting the machine terminals responsive to receipt of a control signal; and a control circuit coupled to the switch means, for providing the control signal to effect closure of the switch means and shorting of the induction machine terminals to transform some of the mechanical input energy into electrical field energy.

* * * * *